United States Patent
Franchitti et al.

(10) Patent No.: US 10,053,121 B2
(45) Date of Patent: Aug. 21, 2018

(54) CONDITION MONITORING SYSTEM AND METHOD FOR MONITORING A CONDITION OF A BEARING UNIT FOR A VEHICLE

(71) Applicants: Julian Franchitti, Erskine (GB); Ramshy Patwari, Edinburgh (GB)

(72) Inventors: Julian Franchitti, Erskine (GB); Ramshy Patwari, Edinburgh (GB)

(73) Assignee: AKTIEBOLAGET SKF, Gothenburg (SE)

( * ) Notice: Subject to any disclaimer, the term of this patent is extended or adjusted under 35 U.S.C. 154(b) by 33 days.

(21) Appl. No.: 14/946,783

(22) Filed: Nov. 20, 2015

(65) Prior Publication Data

US 2016/0152250 A1  Jun. 2, 2016

(30) Foreign Application Priority Data

Nov. 27, 2014 (GB) .................................. 1420146.2

(51) Int. Cl.
  *B61K 9/04* (2006.01)
  *B60B 27/00* (2006.01)
  (Continued)

(52) U.S. Cl.
  CPC ........ *B61L 25/025* (2013.01); *B60B 27/0068* (2013.01); *B61K 9/04* (2013.01);
  (Continued)

(58) Field of Classification Search
  CPC .. B60B 27/0068; F16C 19/525; F16C 19/527; G07C 5/08; G07C 5/0808;
  (Continued)

(56) References Cited

U.S. PATENT DOCUMENTS

2002/0128752 A1   9/2002  Joshi
2003/0088344 A1*  5/2003  Oda ....................... G05D 1/027
                                                    701/23
(Continued)

FOREIGN PATENT DOCUMENTS

WO     2011/029526 A1     3/2011
WO  WO 2011029526 A1 *   3/2011  ............ G01M 17/10
WO     2013/146502 A1    10/2013

*Primary Examiner* — Nga X Nguyen
(74) *Attorney, Agent, or Firm* — Bryan Peckjian; SKF USA Inc. Patent Dept.

(57) ABSTRACT

A condition monitoring system (CMS) for vehicle bearing units, including at least one condition monitoring unit (CMU) for measuring at least one operating parameter of one bearing unit and a control unit for receiving and processing signals from the CMU. The control unit is configured to activate/deactivate the CMU(s) upon reaching at least one predetermined waypoint stored in a waypoint memory of the control unit. The CMS can be equipped with a waypoint setting unit for setting the at least one waypoint at which the CMU(s) shall be activated/deactivated and to store the waypoint in the waypoint memory. The waypoint setting unit processes route data includes data on at least a curviness of at least one route intended for vehicle travel. The processing includes extracting at least one route section within the curviness of the route within a predetermined range and setting the waypoint(s) within the extracted route section.

18 Claims, 4 Drawing Sheets

(51) Int. Cl.
*F16C 19/52* (2006.01)
*B61L 25/02* (2006.01)
*G01S 19/14* (2010.01)
*B61L 15/00* (2006.01)
*G07C 5/08* (2006.01)
*B61L 25/06* (2006.01)
*G07C 5/00* (2006.01)
*B61L 27/00* (2006.01)
*G01M 13/04* (2006.01)

(52) U.S. Cl.
CPC ....... *B61L 15/0027* (2013.01); *B61L 15/0081* (2013.01); *B61L 25/06* (2013.01); *B61L 27/0094* (2013.01); *F16C 19/525* (2013.01); *F16C 19/527* (2013.01); *G01M 13/045* (2013.01); *G01S 19/14* (2013.01); *G07C 5/008* (2013.01); *G07C 5/08* (2013.01); *G07C 5/0808* (2013.01); *G07C 5/0841* (2013.01); *B61L 2205/04* (2013.01)

(58) Field of Classification Search
CPC ... G07C 5/0841; G07C 5/008; B61L 27/0094; B61L 15/0027; B61L 15/0081; B61L 25/025; B61L 25/06; B61L 2205/04; G01S 19/14; B61K 9/04; G01M 13/045; Y02B 60/50

USPC ................ 701/19–20, 460, 23, 533; 318/587
See application file for complete search history.

(56) References Cited

U.S. PATENT DOCUMENTS

| | | |
|---|---|---|
| 2007/0216771 A1 | 9/2007 | Kumar |
| 2009/0026263 A1* | 1/2009 | Schmid .................. G06K 17/00 235/385 |
| 2010/0063657 A1 | 3/2010 | Kumar |
| 2014/0058570 A1* | 2/2014 | Kumar ................... B61C 15/00 700/283 |
| 2014/0156123 A1* | 6/2014 | Cooper ................... B61K 9/08 701/19 |

* cited by examiner

CONDITION MONITORING SYSTEM AND METHOD FOR MONITORING A CONDITION OF A BEARING UNIT FOR A VEHICLE

CROSS REFERENCE TO RELATED APPLICATIONS

This is a Non-Provisional Patent Application, filed under the Paris Convention, claiming the benefit of Great Britain (GB) Patent Application Number 1420146.2, filed on 27 Nov. 2014 (27 Nov. 2014), which is incorporated herein by reference in its entirety.

FIELD OF THE INVENTION

The invention relates to condition monitoring systems used in vehicles to monitor axles or bearing units and to a method for monitoring a condition of a bearing or an axle. In particular, the invention relates to monitoring systems for train axles and/or bearings.

BACKGROUND OF THE INVENTION

It is known to attach condition monitoring units to a train axle or to a bearing thereof in order to monitor parameters such as vibration, temperature and acoustic emission.

Within the automotive sector, there are a plethora of wired sensors, many of which are associated with ECU (Engine Control Unit) and OBD (On Board Diagnostic) systems. These sensors are fully integrated into the vehicle's infrastructure such that during the vehicle's operation they have a continuous power supply. Data communications are supported by a CAN (Controller Area Network) bus. These sensor systems operate continuously to monitor their target parameters.

Locomotives and passenger carriages also have a range of sensor systems that are fully integrated, but these are generally related to safety critical functionality.

In applications where no network structure exists or where the condition monitoring unit has to be attached to rotating components, it has been proposed to use wireless nodes. A consideration in the design of wireless sensor systems is the time between maintenance which is frequently dictated by the life of their batteries. As a consequence, power management is an important factor in the design of wireless sensor systems because it has an immediate impact on maintenance intervals.

Currently available condition monitoring solutions with permanent power sources are configured to capture data continuously. However the captured data generally contain a large volume of artifacts and the measured curves reflect the curviness of the track, imperfections of the rails and other external influences. It is therefore necessary to use complex algorithms to filter the data to eliminate artifacts and to extract valuable and reliable information on the condition of the bearing from the large volume of data.

In order to save power and to ensure good data quality, it has been proposed to limit the measurement to specific sections of a track where low background noise and external factors are expected. To this end, it has been proposed to set predetermined waypoints triggering a measurement based on GPS data. If a certain waypoint along a track is reached, the control unit triggers a signal starting the condition monitoring units to measure the operating parameters of the bearings or other components being monitored and, likewise, the monitoring is stopped if the vehicle leaves the track.

To ensure consistent and reliable data readings, the condition monitoring unit should capture data on a known good quality section of track. Preferably, the track or route should be straight, level and allow the train to reach and maintain a constant speed. Additionally these waypoints are track trigger co-ordinates and function as reference points for data trending as all measurements will therefore be referenced to the same points on the track or route.

Energy consumption can be reduced significantly by powering on and logging data for short periods of time when the correct conditions are met. Triggering measurements on a known piece of track reduces data collection errors or anomalies and optimizes the power usage. The reduced energy consumption may enable using generators or power harvesting means with lower rated power or increase the longevity of batteries.

According to the prior art, these GPS-waypoints triggering the activation or deactivation of the sensor units or condition monitoring units are set manually in advance. This is burdensome and complicated and requires the involvement of skilled engineers having both knowledge of the geographical and technical details of the track and of the technology being monitored.

SUMMARY OF THE INVENTION

The invention seeks to overcome the above problems of the prior art by providing a condition monitoring system capable of automatically detecting waypoints triggering the activation and/or deactivation of condition monitoring units.

A first aspect of the invention relates to a condition monitoring system for bearing units for a vehicle, the system comprising at least one condition monitoring unit for measuring at least one operating parameter of one bearing unit and a control unit for receiving and processing signals obtained from the condition monitoring unit, wherein the control unit is configured to detect a geographic position of the vehicle and to activate and/or deactivate the at least one condition monitoring unit upon reaching at least one predetermined waypoint stored in a waypoint memory of the control unit.

It is proposed to further equip the system with a waypoint setting unit for setting the at least one waypoint at which the at least one condition monitoring unit shall be activated and/or deactivated and to store the waypoint in the waypoint memory, wherein the waypoint setting unit is configured to process route data including data on at least a curviness of at least one route on which the vehicle is intended to travel, the processing of route data including extracting at least one route section within which the curviness of the route is in a predetermined range and setting the at least one waypoint within the extracted route section.

The invention enables a fully automates setting of waypoints based on digital processing of route data with the possibility to freely set the criteria such as curviness or other parameters as desired. The invention greatly simplifies the power management by enabling a reliable triggering in order to operate the system on an intermittent basis instead of continuous operation.

The extracted set of route or track sections can be selected such that high quality data may be expected as indicated above. The parameter describing the curviness of the track section may be the curvature radius, the inverse thereof or a local curviness as defined in the field of differential geometry. The curviness of a road section can be defined as the average local curvature or as the maximum local curvature on the section.

Given the need to minimize power consumption, the invention enables making the sensor systems operational only when their monitoring of components is essential or will yield the most effective results. When the machinery being monitored is part of a mobile system such as a train, then additional external factors need to be considered. The nature of these external factors is varied and their relevance is often associated with the parameters of interest for the wireless sensor system. For example, if a sensor system is monitoring a wheel bearing on a train, the nature of the track it is running on is highly relevant. Wheel bearings are likely to be at their maximum and minimum loading on curved sections of track, while sets of points will impact on the sensor data.

The nature of the parameters being monitored often dictates the approach being adopted. Termination of an operating period is also worthy of similar consideration. In addition, when dealing with mobile systems such as vehicles, there may be a need for data from the wireless sensor systems to be transmitted to an external system. When short range RF communications are employed and the external system is a fixed installation, it may be appropriate to apply consideration to triggering communication systems based on geographic location, i.e. only when the external system is within the communication range.

According to a further aspect of the invention, the waypoint setting unit is configured to extract a slope of the extracted route section form the route data and to discard the extracted route section when the slope is out of a predetermined range.

The inventors further propose that the waypoint setting unit is configured to determine a center point of the extracted route section and to set a waypoint on each side of the center point such that the waypoint divides a distance between the center point and the end points into a predetermined ratio, respectively, wherein the predetermined ratio is preferably 50%.

According to a further aspect of the invention, the waypoint setting unit is configured to set at a predetermined distance from the end points of the extracted route section. The distance may e.g. account for the length of the train and avoids activating the condition monitoring unit when the tail end of the train has not yet entered the route section selected for monitoring.

The inventors further propose that each of the waypoints indicates the beginning or the end of one route section out of a predetermined set of route sections within which the condition monitoring unit shall be activated. The same waypoint may be used to indicate both the beginning and the end of the route section when the waypoint is stored along with a direction of travelling based on which the control unit interprets the waypoint.

In a preferred embodiment of the invention, the control unit is equipped with a memory for storing at least one radius and coordinates of a plurality of waypoints, wherein the control unit is configured to activate and/or deactivate the condition monitoring unit when the distance between at least one of the waypoints and the detected geographic position is smaller than the radius. By setting a radius, imprecision in the detection of the geographical position and/or in the setting of the waypoints can be compensated. The waypoint need not be reached exactly. Rather, it is sufficient if the vehicle approaches the waypoint up to a certain minimum distance.

According to a further aspect of the invention, the memory is configured to store a travelling direction in relation with at least one of the waypoints, wherein the control unit is configured to activate and/or deactivate the condition monitoring unit when the distance between at least one of the waypoints and the detected geographic position is smaller than the radius and when further the travelling direction of the vehicle matches the travelling direction stored in relation to the at least one waypoint.

The radius avoids missing triggering at waypoints and it also makes the placement of waypoints much easier as the placement need not be 100% accurate. The receivers have inaccuracies due to GPS signal reflections and sometimes are slightly inaccurate.

The trigger radius enables the placement of a boundary around a waypoint. It can be used e.g. in case where the waypoint is some meters away from the rail track and not directly on it. The user can specify that if the receiver is within 100 m or any other suitable distance of any waypoint it should trigger. It could also useful when the user wishes to trigger at a very specific point on a track, perhaps for track quality assessment. This could be achieved by setting the radius to be smaller.

The inventors further propose that the condition monitoring unit is configured to communicate with the control unit in a wireless way. This enables the use of the system according to the invention even in vehicles without communication infrastructure such as in freight trains. The invention combines the functionality of GPS systems with wireless sensor system in order to optimally control intermittent monitoring operations for vehicles and other mobile machinery. This offers a departure from its standard uses where sensor operations are continuous. Consequently, a method has been developed that uses GPS location information as the trigger for initiation and termination of wireless sensor operations.

According to a further aspect of the invention, the condition monitoring unit is configured to be attached to a hub unit of a train, wherein the control unit is configured to monitor the condition of a plurality of hub units of the train.

In a preferred embodiment of the invention, the control unit is configured to trigger simultaneous measurements across multiple condition monitoring units at a given geographical location corresponding to the waypoint.

The inventors further propose that the control unit is configured to use the data collected by the condition monitoring units for the purpose of measuring track quality as a tool for infrastructure monitoring.

A further aspect of the invention relates to a method for monitoring a condition of a bearing unit for a vehicle using at least one condition monitoring unit for measuring at least one operating parameter of one bearing unit and a control unit for receiving and processing signals obtained from the condition monitoring unit, wherein the condition monitoring unit is activated and/or deactivated upon reaching at least one predetermined waypoint stored in a waypoint memory of the control unit.

It is proposed that the method includes a waypoint setting step of setting the at least one waypoint at which the at least one condition monitoring unit shall be activated and/or deactivated and to store the waypoint in the waypoint memory, wherein the waypoint setting step includes processing route data including data on at least a curviness of at least one route on which the vehicle is intended to travel, the processing of route data including extracting at least one route section within which the curviness of the route is in a predetermined range and setting the at least one waypoint within the extracted route section.

It is further proposed that the system further comprises a device for detecting a geographic position of the vehicle or of the condition monitoring unit, wherein the condition monitoring unit is configured to be activated and/or deactivated depending on the detected geographic position.

The possibility to trigger the monitoring as a function of the geographic position has the advantage that the capturing of data can be restricted to parts of the track or of the route of the vehicle where reliable data acquisition is expected. This solution can repeatedly identify when and where to trigger the data recording. The geographic position does not need to be defined in terms of GPS coordinates but may of course be defined e.g. as a distance travelled along a predetermined route from a given starting point.

However, associating a GPS navigation system with the monitoring system provides the basis for a triggering system based on geographical locations without the need for infrastructure such as trackside hotboxes. Such a mechanism enables the wireless sensor system to monitor parameters of interest over the same section of track on every occasion the train passes over it, irrespective of the time of day or frequency it passes over this section of track.

In a preferred embodiment of the invention, the device for detecting the geographic position includes a circuit for receiving signals of satellites of a global positioning system (GPS). It is considered that GPS offers the most appropriate enabling mechanism to fulfill the requirements of the system according to the invention.

The GPS system, incorporated in the system's control unit located on the train or the truck, can accurately monitor and confirm the train's position and speed. Long and straight sections of track, suitable for capturing data on can be identified and the coordinates programmed into the control unit. When arriving at these coordinates, the central control unit can issue a command to wake the condition monitoring units from sleep mode, relay the appropriate train speed and trigger data measurements. If the correct GPS and/or speed conditions are not met, no data recording is performed thus saving energy.

Automatic "wake up", start of data recording and return to "sleep mode" of the condition monitoring unit triggered by GPS position in conjunction with rail network mapping is a very efficient way to reduce energy consumption and computational complexity of the data processing as described above.

The system can be applied to any kind of vehicle including in particular trains and trucks.

In a preferred embodiment of the invention, it is proposed that the circuit for detecting a geographic position is part of the control unit of the vehicle located centrally, e.g. in a locomotive of the train or in a cabin of a truck. Existing GPS receivers in vehicle control systems can be used.

As an alternative embodiment of the invention, it is proposed that the circuit for detecting a geographic position is part of the condition monitoring unit attached to the bearing unit. The circuit for detecting a geographic position could be a simple GPS receiver as known form mobile phone technology, which will be sufficiently small to be integrated into the condition monitoring unit in/on the axle box.

A further aspect of the invention relates to a condition monitoring unit for use in a condition monitoring system as described above, wherein the condition monitoring unit includes a controller configured to operate in an energy saving sleep mode and in an active mode, wherein at least some of the parameters being monitored in the active mode are not monitored in the sleep mode, wherein the controller is configured to switch the condition monitoring unit from the sleep mode to the active mode and from the active mode into the sleep mode based on signals received by the controller.

Further, it is proposed that the controller is configured to switch the condition monitoring unit from the sleep mode to the active mode upon receipt of a wake-up signal from a control unit of a vehicle in which the condition monitoring operates and to switch the condition monitoring nit from the active mode into the sleep mode upon receipt of a sleep signal from the control unit.

A further aspect of the invention relates to the use of the system as specified above for the purpose of measuring track quality as a tool for infrastructure monitoring. Since the wireless sensors are configured to capture bursts of acoustic emission and vibration at specific locations, they could also be used to capture characteristics of the track condition at specific track segments. In cases where a rail operator suspects that a given section of track may be damaged and in turn may be causing passenger discomfort or damage to rolling stock, the system may be configured to capture data at these specific segments in order for the rail operator to trend degradation or ascertain if the track segment is in fact damaged.

The following non-limiting description of embodiments of the invention as well as the appended claims and figures show multiple characterizing features of the invention in specific combinations. The skilled person will easily be able to consider further combinations or sub-combinations of these features in order to adapt the invention as defined in the claims to his or her specific needs

DETAILED DESCRIPTION OF THE EMBODIMENTS

Figure 1:
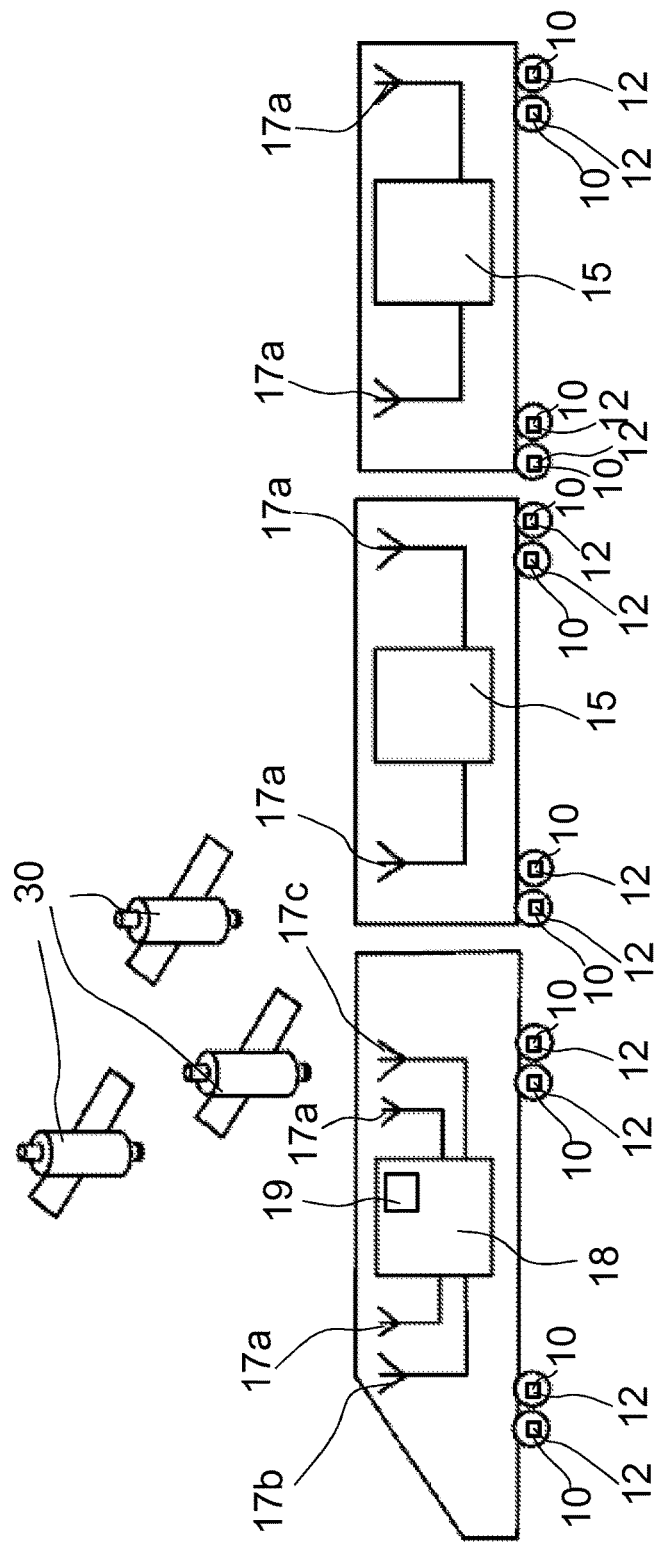
FIG. 1 is a schematic representation of a train including a condition monitoring system for bearing units for vehicles according to the invention.

FIG. 1 is a schematic representation of a train including a condition monitoring system for bearing units for vehicles according to the invention. The system comprises multiple condition monitoring units 10—one for each wheel of the train—for measuring at least one operating parameter of one bearing unit of a train axle box. The condition monitoring units 10 are formed as wireless sensor nodes attached to or embedded into the end plate of a double row roller bearing assembly of the hub (not shown). The measured operating parameters include vibrations, acoustic emissions and temperature of the bearing and the condition monitoring units 10 include corresponding sensors 12 respectively.

A system concentrator serving as a control unit 18 for receiving and processing signals obtained from the condition monitoring unit 10 is provided in a locomotive of the train. The control unit 18 is essentially a personal computer equipped with software for controlling and monitoring various mechanical devices of the train and for issuing warning signals in cases where damages are detected or likely to occur based on the signals received from the condition monitoring units 10.

The communication between the control unit 18 and the condition monitoring units 10 is at least partially wireless using antennae 17a. If necessary, each of the wagons is provided or some of the wagons are provided with a remote network manager 15 serving as a wireless network manager, a power supply manager for the units 10 and as a wireless network extender. The wireless network can be a single-band 2.4 GHz network or a dual band 2.4 GHz and 5 GHz network. The skilled person may use other communication frequencies or protocols including different protocols for the backbone and for the communication between extenders and the units 10 depending on the circumstances.

The control unit 18 is further equipped with a GPS antenna 17c and with an antenna 17b for a mobile communication interface using e.g. a GSM, GPRS, UMTS, LTE or HSDPA standard.

In the embodiment of FIG. 1, the control unit 18 comprises a GPS receiver 19 receiving positioning signals from a system of satellites 30 as circuit for detecting a geographic position. The system is configured such that the condition monitoring units 10 are activated and/or deactivated depending on the detected geographic position as further explained below.

Figure 2:
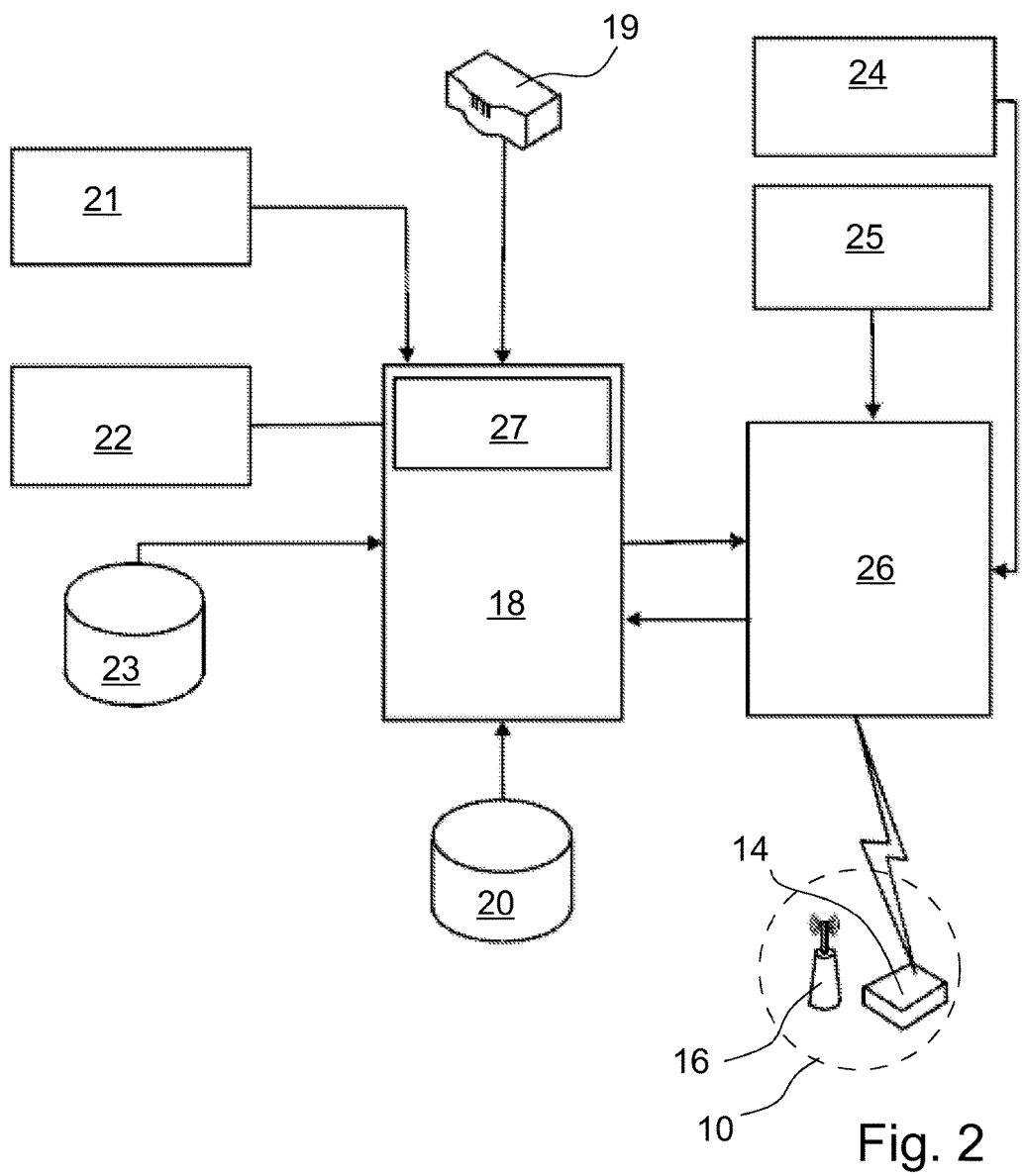
FIG. 2 is system component diagram of the monitoring system according to the invention is illustrated.

A system component diagram of the monitoring system according to the invention is illustrated in FIG. 2.

The condition monitoring units 10 are provided with a controller 14 and a transmitter 16 for wireless communication and with batteries powering the sensors, the controller 14 and the transmitter 16.

The control unit 18 is equipped with a memory 20 for storing route data of the vehicle as well as other data including sensor data captured by the sensors 12. In the embodiment were the vehicle is a train, the route data is a map of a railway network. In other embodiments, the route data may be a collection or a database of waypoints or a network made up of nodes and links. The railway network is composed of a plurality of sections or links stored in the database in the memory 20 in combination with parameters describing properties of the section such as a slope, average curvature, and maximum allowable travelling speed. The database in the memory 20 includes a plurality of possible route sections along which the vehicle can travel.

A waypoint setting unit 22 is configured to set waypoints for activating the condition monitoring units 10 with the sensors 12 in suitable sections of the track. Deactivation waypoints can be set by the waypoint setting unit 22 as well.

The waypoint setting unit 22 can be part of the control unit 18 or of a remote server sending the waypoints to the control unit 18 using the mobile communication interface.

Each of the waypoints is a data structure comprising not only the GPS coordinates but a further optional field indicating the travelling direction of the train in which the monitoring shall be triggered. Further, the data structure may comprise fields for upper and lower speed limits and, in one embodiment of the invention, for a radius, i.e. a minimum distance to the GPS coordinates required to trigger the waypoint alarm. Accordingly, the system can be configured such that the alarm is not triggered every time the train passes the waypoint but rather only when the train passes in one of the two possible directions on a track and when the speed is in a desired range suitable for obtaining measurements of high quality.

In the embodiment of the figures, the waypoint setting unit 22 is a GUI Application for planning the data collection waypoints on the train's route. These may in particular include actual co-ordinates on a straight path where the speed is known to be constant. The waypoint setting unit 22 in the embodiment provides a KML (Keyhole Markup Language) file or other kind of standard file format (e.g. GML) which is a standard for GIS data used by various map providers. This generic file can be used by a server of the condition monitoring system to download and use the waypoints or waypoints, which are stored in a waypoint database 23.

The waypoints are candidates for starting points and endpoints of route sections which are part of a set of predetermined route sections in which the data acquisition by the condition monitoring units 10 shall be activated.

The control unit 18 is configured to activate the condition monitoring unit 10 by sending a wakeup signal when the train passes a waypoint, i.e. enters a new route section among the set of route sections extracted and selected for monitoring. When the train passes a deactivating waypoint, i.e. leaves the route section for which the measurement shall be performed, the control unit 18 deactivates the condition monitoring units 10 by sending a sleep signal.

After completion of the measurement, the measured data are stored in the memory 20 and sent to a remote condition monitoring server using the mobile communication interface of the control unit 18.

In a preferred embodiment of the invention, the GPS module 27 is implemented as a library or a GPS processing thread in the control unit 18. It will have the required functionality of GIS Data acquisition from the Global Navigation Satellite System (GNSS) receiver 19. A thread in the control unit 18 loads the software module and starts GPS message interpretation. This thread is managed by the option setup in the server manager of the control unit 18. If the GPS option is selected and the appropriate KML data is loaded, the thread starts.

On start, the GPS module 27 automatically connects to the GPS devices and detects connected emulators. Then, the GPS system listens and interprets messages for Position, Speed, and Direction encoded according to the standards set by the national marine electronics association (NMEA). Then, the in-memory waypoint database 23 with the collection of waypoints in the memory 20 is updated using the data received from the waypoint setting unit 22. Based on the position, the GPS system determines a waypoint arrival for each of the provided waypoints and notifies the clients when the waypoint is reached.

The system further comprises a server manager application 21 providing configuration data, a collector application 24 for triggering measurements manually, a device manager application 25 for managing the settings of the units 10 on the wheels and a communication service 26.

Optionally, the GPS system watches for speed changes beyond tolerance limits (if provided) and notifies changes. To this end, the NMEA messages are repeatedly received and processed until a Stop message is received. On Stop, the necessary clean-up is performed.

Figure 3:
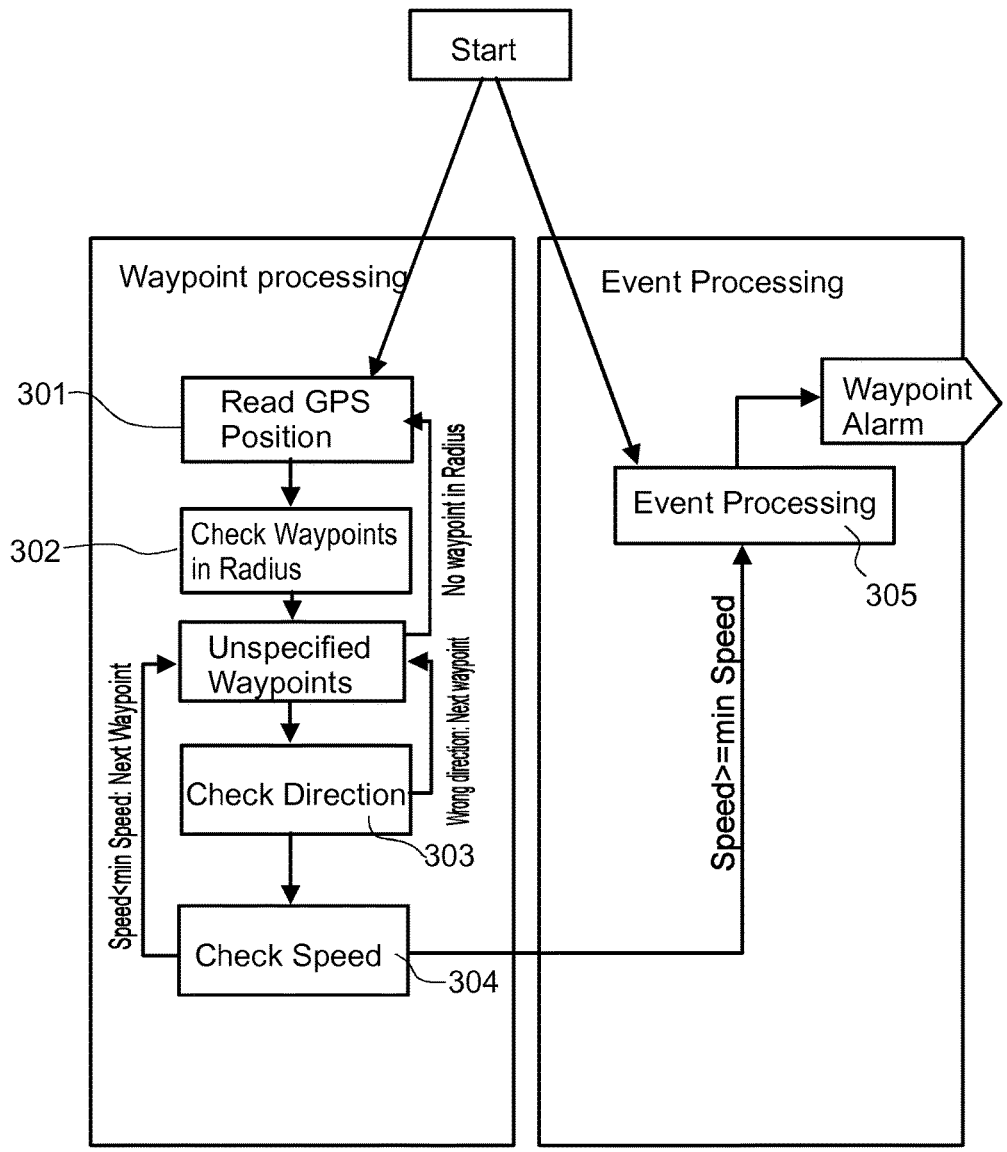
FIG. 3 illustrates the waypoint alarm activity algorithm implemented control unit determining the waypoint arrivals for the waypoints according to the invention.

A more detailed illustration of the waypoint alarm activity algorithm implemented in the GPS module 27 determining the waypoint arrivals for the waypoints is illustrated in FIG. 3. The GPS module starts and it works in 2 parallel paths. The waypoint processing is illustrated on the left-hand side in FIG. 3 and the event processing is illustrated on the right-hand side in FIG. 3. In the waypoint processing, on each receipt of position data from the GPS receiver 19 in a step 301, a check is made in a step 302 if any waypoints are in a pre-configured search radius of the current position. The pre-configured search radius may be set depending on the position and/or depending on the monitoring task.

If there are any waypoints within the search radius, the direction variable stored in relation to each of them is checked if it matches the direction of the vehicle in a step 303. If the direction is matched, the speed is checked in a step 304. When the speed is greater than or equal to the pre-configured value, the event processing path is invoked to raise a waypoint alarm in a step 305. The current position, details of the waypoint and the speed of travel are included as part of the alarm message. The subscriber to this alarm is control unit 18, which communicates to the sensor nodes 10 to perform data collection using the interface 26.

In embodiments where a radius specific to a waypoint is set, the latter should be set smaller than the search radius and the waypoint alarm should be triggered only when the distance to the waypoint is within both the search radius and the waypoint-specific radius. Once a waypoint alarm has been generated, the waypoint is marked as processed.

An alternative method of triggering measurements is facilitated by the system where a precise network time is specified for the measurement commencement time. The system application software monitors positional data which is constantly provided by the GPS module and estimates the time it will take to reach the waypoint location. At a time prior to reaching the waypoint, the system application software issues a broadcast message over TCP/IP to the gateway manager(s) to instruct the nodes to trigger at a given network time in the future. When this time is reached each node performs a measurement, and the data is stored internally along with the time at which it was instructed to record the dataset.

Figure 4:
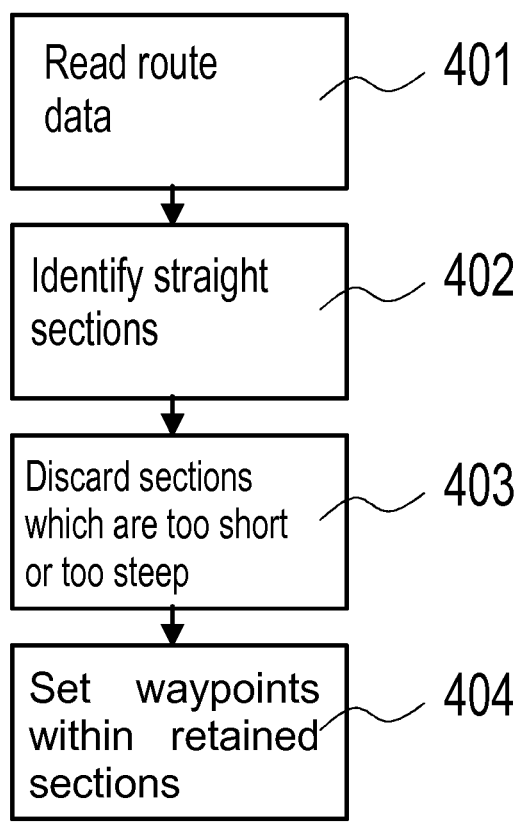
FIG. 4 illustrates the method for setting the waypoints implemented in the waypoint setting unit according to the invention.

FIG. 4 illustrates the method for setting the waypoints based on the route data as implemented in the waypoint setting unit 22 defined above. The waypoint setting unit 22 reads the route data, including data on at least a curviness of the route on which the waypoints are located, in a step 401. The curviness is stored in the route data as local curvature radius of the track as a function of the track position. In a step 402, the waypoint setting unit 22 identifies points where the local curvature radius crosses a predetermined threshold and identifies straight sections or low-curviness sections of the track as sections delimited by the points where the curvature radius is larger than the threshold value.

In a step 403, the waypoint setting unit 22 then further examines the low-curviness sections for suitability for condition monitoring and discards sections which are too short or where the slope is outside of a predetermined range. For the latter purpose, the waypoint setting unit 22 is configured to extract a slope of the extracted route section form the route data and to discard the extracted route section when the slope is out of a predetermined range, i.e. not sufficiently level. Alternatively, the waypoint setting unit 22 could use altitude variations rather than a slope as a criterion to identify suitable sections of the track.

The remaining sections are retained by the waypoint setting unit 22 as suitable for setting waypoints. To this end, the waypoint setting unit 22 is configured to determine a center point of the extracted route section as a first waypoint and to set a waypoint on each side of the center point such that the waypoint divides a distance between the center point and the end points in a predetermined ratio, respectively, wherein the predetermined ratio is preferably 50%.

The waypoints set by the waypoint setting unit 22 could be presented as a suggestion for coordinates of good quality track segments to the user, who can then choose specific waypoints based on the system requirements. The user can export the desired waypoints in a desired data format. Alternatively, the waypoints as determined above could be immediately adopted by the system.

The activation and deactivation may further be dependent on other parameters such as travelling speed, outside temperature and elapsed time since the last activation.

As already mentioned earlier, condition monitoring unit 10 for use in the condition monitoring system as described above includes a controller 14 configured to operate in an energy saving sleep mode and in an active mode. The controller 14 is configured to switch the condition monitoring unit 10 from the sleep mode to the active mode and from the active mode into the sleep mode based on signals received by the controller 14 via the transmitter 16 form the control unit 18. More specifically, the controller 14 is configured to switch the condition monitoring unit 10 from the sleep mode to the active mode upon receipt of a wake-up signal from a control unit 18 and to switch the condition monitoring unit 10 from the active mode into the sleep mode upon receipt of a sleep signal from the control unit 18.

When considering the example of a train presented above, waypoint co-ordinates are pre-logged in a database using a GUI waypoint setting unit 22 application in the central control unit 18 as the central hub which manages the monitoring system operation.

A hardware GNSS receiver module receives GIS signals from multiple satellites 30 and converts the signals into NMEA formatted messages for the GPS module which continually provides application software with location information including longitude and latitude data which the PC application can use to determine the approximate distance (and time) to the target waypoint.

The application software in the control unit 18 maintains a dynamic table in the database to coordinate the data received as a response to the broadcast command. This is done to prevent data loss during power outages or connectivity issues. The dynamic data needs to be flushed at predetermined intervals.

As an optional feature, speed changes are constantly reported by the GPS module and if the speed changed event is handled the database is updated accordingly.

When the overall data is received, the date/time and speed are compared with the database and for any speed changes. If the speed has remained constant, the sample is logged and the waveform is requested. If any speed changed value exceeding a threshold value is observed, the sample is rendered invalid and not stored in the database.

In further embodiments of the invention, the condition monitoring system may include an INS (Inertial Navigation System). Further, it is possible to equip the condition monitoring units 10 with a 3 or 6 axes accelerometer or gyroscope and to use the data measured by these devices in processing the waveforms and/or in judging the reliability of the data. This would enable improved control of the sensor system and assist with data processing by providing additional environmental information by enabling incorporation of some track-related variation in addition to accurate acceleration measurements.

Taking such factors into consideration assists in maintaining consistency of the conditions under which monitoring is conducted. It could also prove useful when monitoring on curved sections of track by providing angular acceleration and velocity readings. After all, these same principles of operation would apply not simply for a straight piece of track, but for any section of track the train travels over and, for example, monitoring bearings under maximum load can provide useful information.

What is claimed is:

1. A condition monitoring system for bearing units for a vehicle, the system comprising:
   at least one wireless sensor node that measures at least one operating parameter of one of the bearing units when active;
   a waypoint setting server that sets at least one waypoint that is utilized to activate the at least one wireless sensor node, that processes route data including at least data on a curviness of at least one route of the vehicle by extracting at least one route section within which the curviness of the at least one route is in a predetermined range and setting the at least one waypoint within the at least one route section; and
   a control computer comprising a global positioning system module that determines a waypoint arrival with respect to at least one waypoint, the control computer activating the at least one wireless sensor node when the waypoint arrival is determined to cause the one wireless sensor node to measure the at least one operating parameter,
   wherein the global positioning system module operates in at least two parallel processing paths comprising a waypoint processing and an event processing,
   wherein the waypoint processing comprises performing a check on each receipt of position data from the global positioning system receiver if any of the at least one waypoints are in a pre-configured search radius of a current position of the vehicle, and
   wherein the event processing path comprising raising a waypoint alarm,
   wherein the global positioning system module checks a direction variable stored in relation to each of the at least one waypoints to determine whether a matches exists when one of the at least one waypoints are within the pre-configured search radius, and
   wherein when the direction variable is matched, a speed is checked with respect to a pre-configured value,
   wherein when the speed is greater than or equal to the pre-configured value, the event processing path is invokes the waypoint alarm.

2. The condition monitoring system according to claim 1, wherein the waypoint setting server extracts a slope of the at least one route section form the route data and discards the at least one route section when the slope is out of a second predetermined range.

3. The condition monitoring system according to claim 1, wherein the waypoint setting server sets the at least one waypoint at a predetermined distance from end points of the at least one route section.

4. The condition monitoring system according to claim 1, wherein the waypoint setting server sets a plurality of waypoints, each of which indicates one of a beginning or an end of the at least one route section out of a predetermined set of route sections within which the wireless sensor node is activated.

5. The condition monitoring system according to claim 1, the control computer further comprises a memory for storing at least one radius and coordinates of a plurality of waypoints,
   wherein the control computer is configured to at least one of activate and deactivate the wireless sensor node when a distance between at least one of the plurality of waypoints and a detected geographic position is smaller than the at least one radius.

6. The condition monitoring system according to claim 5, wherein the memory is configured to store a travelling direction in relation with the plurality of waypoints,
   wherein the control computer activates the wireless sensor node when the distance between at least one of the plurality of waypoints and the detected geographic position is smaller than the at least one radius and when the travelling direction of the vehicle matches the travelling direction stored in relation to the at least one waypoint.

7. The condition monitoring system according to claim 1, wherein the wireless sensor node wirelessly communicates with the control computer in a wireless way.

8. The condition monitoring system according to claim 1, wherein the wireless sensor node is attached to a hub unit of a train,
   wherein the control computer monitors the condition of the hub unit of the train.

9. The condition monitoring system according to claim 1, wherein the control computer triggers simultaneous measurements across multiple wireless sensor nodes at a given geographical location corresponding to the at least one waypoint.

10. A condition monitoring method for bearing units for a vehicle, the condition monitoring method comprising:
    measuring, by at least one wireless sensor node, at least one operating parameter of one of the bearing units when active;
    setting, by a waypoint setting server, at least one waypoint that is utilized to activate the at least one wireless sensor node;
    processes, by the waypoint setting server, route data including at least data on a curviness of at least one route of the vehicle by extracting at least one route section within which the curviness of the at least one route is in a predetermined range and setting the at least one waypoint within the at least one route section;
    determining, by a global positioning system module of a control computer, a waypoint arrival with respect to at least one waypoint;
    activating, by the control computer, the at least one wireless sensor node when the waypoint arrival is determined to cause the one wireless sensor node to measure the at least one operating parameter,
    wherein the global positioning system module operates in at least two parallel processing paths comprising a waypoint processing and an event processing,
    wherein the waypoint processing comprises performing a check on each receipt of position data from the global positioning system receiver if any of the at least one waypoints are in a pre-configured search radius of a current position of the vehicle, and
    wherein the event processing path comprising raising a waypoint alarm,
    wherein the global positioning system module checks a direction variable stored in relation to each of the at least one waypoints to determine whether a matches exists when one of the at least one waypoints are within the pre-configured search radius, and
    wherein when the direction variable is matched, a speed is checked with respect to a pre-configured value,
    wherein when the speed is greater than or equal to the pre-configured value, the event processing path is invokes the waypoint alarm.

11. The condition monitoring method according to claim 10, the condition monitoring method further comprising:
   extracting, by the waypoint setting server, a slope of the at least one route section form the route data, and
   discarding, by the waypoint setting server, the at least one route section when the slope is out of a second predetermined range.

12. The condition monitoring method according to claim 10, the condition monitoring method further comprising:
   determining, by the waypoint setting server, a center point of the at least one route section; and
   setting, by the waypoint setting server, the at least one waypoint on each side of the center point to divide a distance between the center point and end points in a predetermined ratio, respectively.

13. The condition monitoring method according to claim 10, wherein the waypoint setting server sets the at least one waypoint at a predetermined distance from end points of the at least one route section.

14. The condition monitoring method according to claim 10, the condition monitoring method further comprising setting a plurality of waypoints by the waypoint setting server, each of which indicates one of a beginning or an end of the at least one route section out of a predetermined set of route sections within which the wireless sensor node is activated.

15. The condition monitoring method according to claim 10, the condition monitoring method further comprising:
   storing, by a memory of the control computer, at least one radius and coordinates of a plurality of waypoints; and
   activating, by the control computer, the wireless sensor node when a distance between at least one of the plurality of waypoints and a detected geographic position is smaller than the at least one radius.

16. The condition monitoring method according to claim 10, wherein the wireless sensor node wirelessly communicates with the control computer in a wireless way.

17. The condition monitoring method according to claim 10, wherein the wireless sensor node is attached to a hub unit of a train,
   wherein the control computer monitors the condition of the hub unit of the train.

18. The condition monitoring method according to claim 10, the condition monitoring method further comprising triggering simultaneous measurements across multiple wireless sensor nodes at a given geographical location corresponding to the at least one waypoint.

* * * * *